United States Patent
Kirmani et al.

(10) Patent No.: US 12,378,372 B2
(45) Date of Patent: Aug. 5, 2025

(54) HIGH IMPACT STRENGTH BISMALEIMIDE PLASTICS

(71) Applicant: Georgia Tech Research Corporation, Atlanta, GA (US)

(72) Inventors: Mohammad Hamza Kirmani, Atlanta, GA (US); Prabhakar Gulgunje, Atlanta, GA (US); Satish Kumar, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 783 days.

(21) Appl. No.: 17/601,863

(22) PCT Filed: Apr. 17, 2020

(86) PCT No.: PCT/US2020/028636
§ 371 (c)(1),
(2) Date: Oct. 6, 2021

(87) PCT Pub. No.: WO2020/226875
PCT Pub. Date: Nov. 12, 2020

(65) Prior Publication Data
US 2022/0162403 A1    May 26, 2022

Related U.S. Application Data

(60) Provisional application No. 62/836,378, filed on Apr. 19, 2019.

(51) Int. Cl.
*C08K 7/06* (2006.01)
*C08J 3/24* (2006.01)
*C08K 3/04* (2006.01)

(52) U.S. Cl.
CPC ............... *C08J 3/247* (2013.01); *C08K 3/041* (2017.05); *C08K 3/042* (2017.05); *C08K 3/046* (2017.05); *C08K 7/06* (2013.01); *C08J 2379/08* (2013.01)

(58) Field of Classification Search
CPC ....... C08J 3/247; C08J 2379/08; C08K 3/046; C08K 3/041; C08K 3/042; C08K 7/06
See application file for complete search history.

(56) References Cited

U.S. PATENT DOCUMENTS

| 5,639,808 A | 7/1997 | Coggio et al. |
| 5,652,285 A * | 7/1997 | Coggio ................ C08K 5/5399 524/506 |

(Continued)

FOREIGN PATENT DOCUMENTS

CN    107 033 328 A    8/2017

OTHER PUBLICATIONS

AVE ("Vacuum-Degassing", 2017). (Year: 2017).*

(Continued)

*Primary Examiner* — Jiangtian Xu
(74) *Attorney, Agent, or Firm* — Bryan W. Bockhop; Bockhop Intellectual Property Law, LLC (57) ABSTRACT

In a method of making a material, a bismaleimide system is heated to generate a bismaleimide liquid (110). The bismaleimide liquid is degassed (114) to generate a degassed bismaleimide liquid. At least one of high speed shear mixing and probe sonication is performed to the degassed bismaleimide liquid to generate a highly mixed bismaleimide liquid phase (112). The highly mixed bismaleimide liquid phase is cured (116). A bismaleimide product is made by heating a three component bismaleimide system to generate a bismaleimide liquid, which is degassed in a 30 mbar vacuum until no new visually perceptible bubbles are (Continued)

detected. The degassed liquid is high speed shear mixed at a speed of 3500 RPM for 10 minutes to generate a highly mixed bismaleimide liquid phase, which is cured to make the bismaleimide product. A substance includes cured bismaleimide having an impact strength in a range of 56 kJ/m$^2$ to 82 kJ/m$^2$.

32 Claims, 5 Drawing Sheets

(56) References Cited

U.S. PATENT DOCUMENTS

| | | | |
|---|---|---|---|
| 2012/0259042 A1* | 10/2012 | Potisek | C08L 33/18 525/122 |
| 2014/0295723 A1 | 10/2014 | Nelson et al. | |
| 2019/0270678 A1* | 9/2019 | Korzhenko | H01M 4/587 |

OTHER PUBLICATIONS

FlackTek ("High-Speed Mixing Systems for Faster Process Times and Optimized Results") (Year: 2024).*

European Patent Office: "Supplementary European Search Report"; Dec. 9, 2022; Search report in related European case, Serial No. EP 20 80 1748.

Kurahatti et al.: "Role of Zirconia Filler on Friction and Dry Sliding Wear Behaviour of Bismaleimide Nanocomposites"; 2011; Materials and Design 32; pp. 3644-2649.

* cited by examiner

FIG. 1A

FIG. 1B diallylbisphenol A

BMI- 1,3- tolyl

HIGH IMPACT STRENGTH BISMALEIMIDE PLASTICS

CROSS-REFERENCE TO RELATED APPLICATION(S)

This application claims the benefit of U.S. Provisional Patent Application Ser. No. 62/836,378, filed Apr. 19, 2019, the entirety of which is hereby incorporated herein by reference.

STATEMENT OF GOVERNMENT SUPPORT

This invention was made with government support under grant number NNX17AJ32G, awarded by NASA. The government has certain rights in the invention.

BACKGROUND OF THE INVENTION

1. Field of the Invention

The present invention relates to bismaleimides and, more specifically, to a bismaleimide with high impact resistance.

2. Description of the Related Art

Bismaleimides (BMI) are a family of thermoset compounds that include two maleimide groups. Bismaleimide resin systems tend to have high-temperature performance when used as matrix resins in fiber-reinforced composites. Unfortunately, BMIs can be brittle, which can result impact-induced damage. BMI resins tend to be flame retardant because they include aromatic groups and nitrogen. For example, 4,4'-bis(-maleimido)diphenylmethane (BDM) resins exhibit excellent chemical and corrosion resistance, dimensional stability, and good performance at high temperatures.

BMI resins are extensively employed in high-performance aerospace applications owing to their extraordinary thermal stability under both dry and humid conditions. In such uses, increased impact strength (resistance) demonstrated in cured BMI resins can result in improved structural integrity and longer life time.

Therefore, there is a need for cured bismaleimide products with increased impact resistance.

SUMMARY OF THE INVENTION

The disadvantages of the prior art are overcome by the present invention which, in one aspect, is a method of making a material, in which a bismaleimide system is heated to generate a bismaleimide liquid. The bismaleimide liquid is degassed to generate a degassed bismaleimide liquid. At least one of high speed shear mixing and probe sonication is performed to the degassed bismaleimide liquid to generate a highly mixed bismaleimide liquid phase. The highly mixed bismaleimide liquid phase is cured.

In another aspect, the invention is a method of making a bismaleimide product, in which a three component bismaleimide system is heated to generate a bismaleimide liquid. The bismaleimide liquid is degassed by subjecting the bismaleimide liquid to a 30 mbar vacuum until no new visually perceptible bubbles are detected in the bismaleimide liquid to generate a degassed bismaleimide liquid. The degassed bismaleimide liquid is high speed shear mixed in a high shear mixer at a speed of 3500 RPM for 10 minutes to generate a highly mixed bismaleimide liquid phase. The highly mixed bismaleimide liquid phase is cured to make the bismaleimide product.

In yet another aspect, the invention is a substance that includes a cured bismaleimide having an impact strength in a range of 56 $kJ/m^2$ to 82 $kJ/m^2$.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1A:
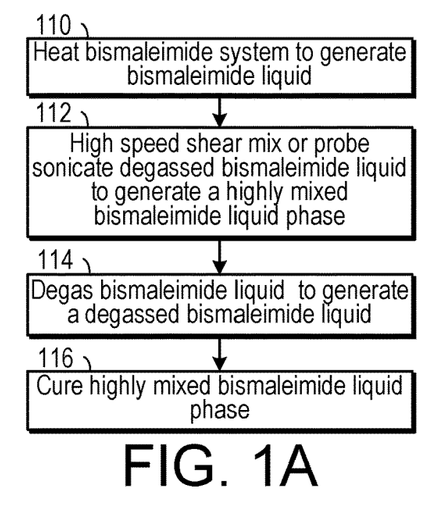
FIG. 1A is a flowchart showing a first embodiment of a method for making a cured bismaleimide product.

As shown in FIG. 1A, one in one representative method of making a bismaleimide material, a bismaleimide system is heated 110 to generate a bismaleimide liquid, typically at a temperature of 110° C. The bismaleimide system can include, for example, a three component bismaleimide system. The bismaleimide liquid is subjected to high speed nano-scale mixing (for example, high speed shear mixing or probe sonication), which generates a highly mixed bismaleimide liquid phase 112. For example, the degassed bismaleimide liquid can be placed in a dual asymmetric centrifugal high speed shear mixer where it is mixed at a speed of 3500 RPM for 10 minutes. The bismaleimide liquid is degassed 114 to generate a degassed bismaleimide liquid. In one embodiment, this is done by subjecting the bismaleimide liquid to a 30 mbar vacuum until no new visually perceptible bubbles are detected in the bismaleimide liquid. The highly mixed bismaleimide liquid phase is cured 116, which can be performed by: heating the highly mixed bismaleimide liquid phase to at least 177° C. for 4 hours to generate a cured material; cooling the cured material to room temperature; then heating the cured material to 227° C. for 2 hours to generate a post-cured material; and cooling the post-cured material to room temperature so as to generate a cured bismaleimide product. Frequently, it is desired that the resulting bismaleimide product be molded in a specific shape. This can be done by heating a mold to 191° C. and then placing the highly mixed bismaleimide liquid phase into the mold prior to the curing step.

Figure 1B:
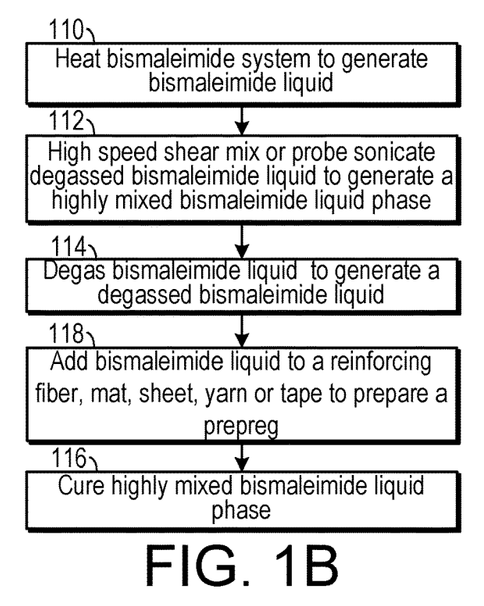
FIG. 1B is a flowchart showing second embodiment of a method for making a cured bismaleimide product.

As shown in FIG. 1B, the bismaleimide liquid can be added to a reinforcing agent 118. The reinforcing agent or agents can include fibers, mats, sheets, yarns, tapes, and combinations of such agents. These reinforcing agents can include, for example, carbon fibers, carbon nanotube sheets, carbon nanotube yarns, carbon nanotube forest and carbon nanotube tape, and combinations of these materials. In one embodiment, reinforcing agents are added to the highly mixed bismaleimide liquid phase prior to curing.

Also, a modifier or modifiers can be added to the bismaleimide liquid prior to the curing step. The modifiers can include graphitic structures such as carbon nanotubes (such as 8-10 nm diameter multi-walled carbon nanotubes), graphene ribbons, and combinations of such graphitic structures. Other modifiers can be added to achieve certain desirable characteristics. Such modifiers can include: an elastomer, a rubber, an emulsifier, calcium carbonate, boron nitride, silicon nitride, silicon carbide, boron carbide, nanoclay, nanosilica, bisphenol A, epoxy, benzoxazine, cyante esters, thermoplastics, and combinations of these modifiers. Use of a rubber (such as a synthetic rubber or a natural rubber) or other elastomer can decrease the glass transition temperature and increase shock absorbing capacity of the material.

In one embodiment, this method results in a cured bismaleimide having an impact strength in a range of 56 kJ/m$^2$ to 82 kJ/m$^2$ (and in one specific embodiment, the cured bismaleimide has an impact strength of 69 kJ/m$^2$) and a density that is no greater than 1.20 g/cc. (In certain applications, such as use in aircraft structural elements, high impact strength and low density can be desirable.) This embodiment can have a glass transition temperature of at least 285° C. when a dynamic mechanical analysis is performed using a three-point bending mode on a dynamic mechanical analyzer (for example, a TA Instruments DMA Q800 dynamic mechanical analyzer) at a frequency of 1 Hz with 2 N load and dynamic 0.01% strain over the 35-350° C. temperature range at a heating rate of 3° C./min using sample dimensions of 30 mm×12 mm×3.2 mm.

Figure 2A:
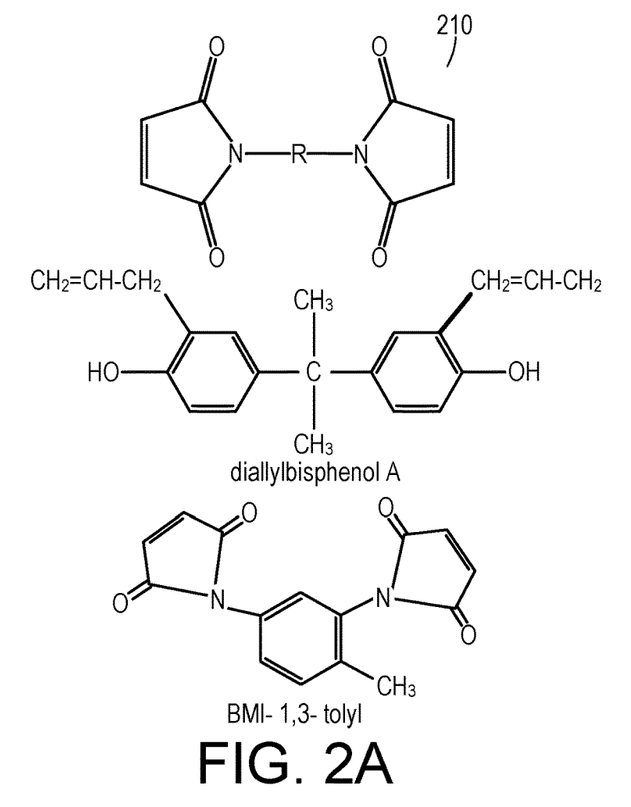
FIG. 2A is a series of molecule (structural formula) diagrams showing the structure of the components of a bismaleimide system.
Figure 2B:
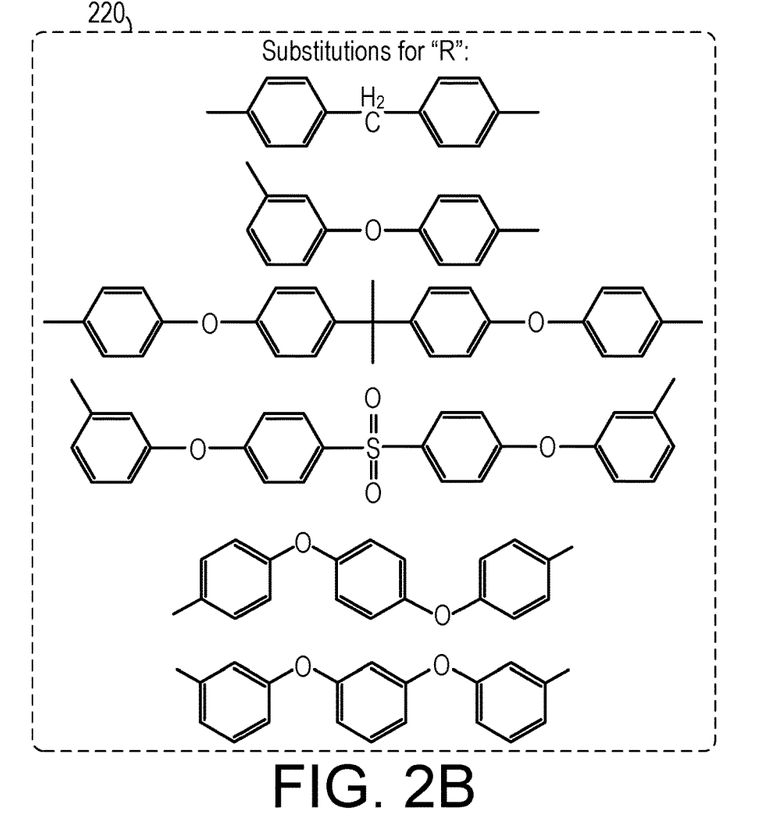
FIG. 2B is a series of molecule diagrams showing the structure of the components that can be substituted for "R" in the top formula shown in FIG. 2A.

As shown in FIGS. 2A and 2B, the bismaleimide system can include (for example) three components, including a BMI 210, a diallylbisphenol A and a BMI-1,3-tolyl. Several substitutions for "R" in the BMI 210 are shown in FIG. 2B.

Figure 3:
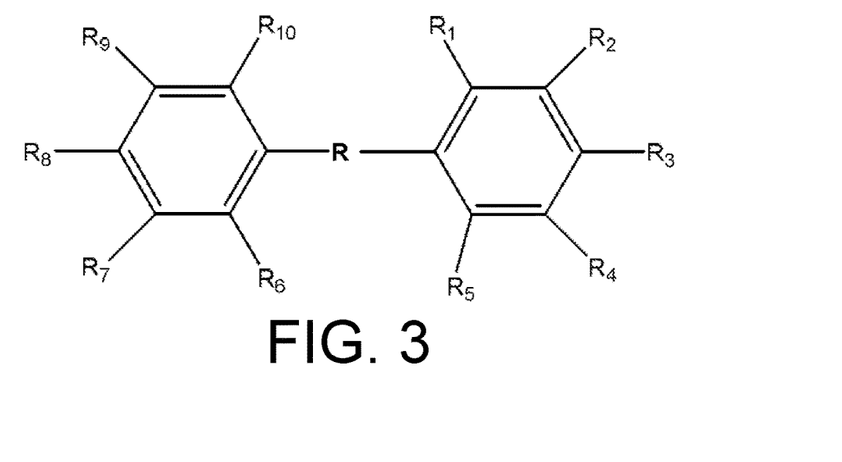
FIG. 3 is a molecule diagram showing the general structure bisphenol based modifier

The general structure of a bisphenol based modifier is shown in FIG. 3. In this structure, one out of R1, R2, R3, R4 and R5 is an —OH chemical group and one out of the R6, R7, R8, R9 and R10 is an —OH chemical group. The remaining of R and R1-R10 can include any compatible chemical groups.

Figure 4:
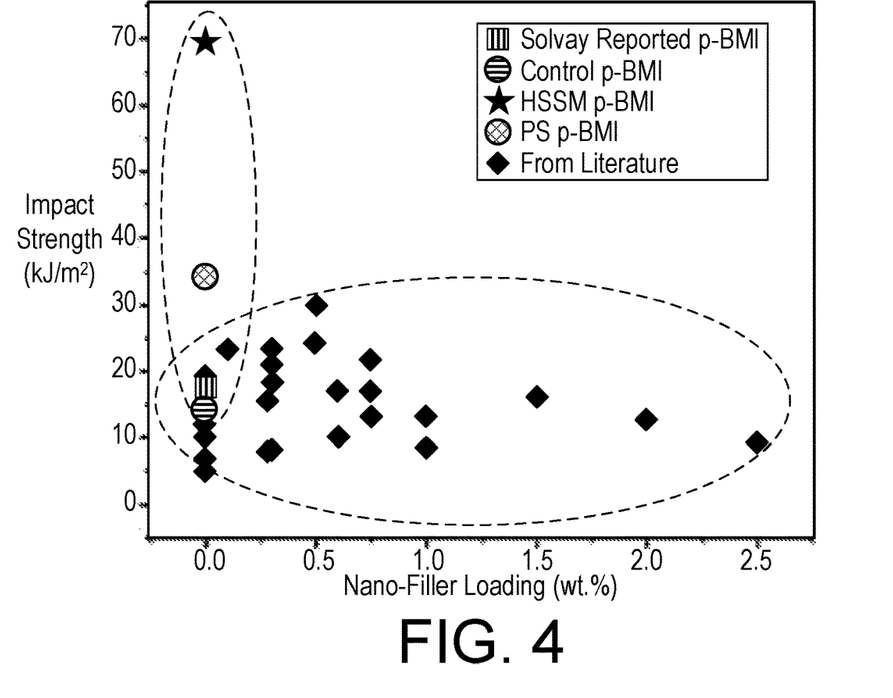
FIG. 4 is a graph relating impact strength of certain materials to nano-filler loading.

As shown in FIG. 4, the impact strengths of several different bismaleimide systems as a function of nano-filler loading are shown. As can be seen, the high speed sheer mixed (HSSM) bismaleimide system described above demonstrated very high impact strength (about 69 kJ/m$^2$) with no nano-filler loading (this is the material designated with a star and labelled "HSSM p-BMI"). The material subjected to probe sonication (the material designated by a circle filled with crisscross lines and labelled "PS p-BMI") also showed high impact resistance with no nano-filler loading. The material designated by a circle filled with horizontal lines and labelled "Control p-BMI" was a control material made simply by curing melted BMI without either high speed sheer mixing or probe sonication. This plot compares the impact strength value exhibited by HSSM and Melt BMI specimens derived from one experimental embodiment, with values reported in the literature for pristine BMI systems as well as their nano-composites.

In one experimental embodiment, a high-speed shear mixer, DAC 150.1 from Flacktec Inc. was used for mixing the BMI resin. 60 grams of BMI resin stored at −25° C. was kept out at room temperature for 30 mins. It was then melted and degassed at 110° C. for about 15 minutes under vacuum until no bubbles are seen to be drawn out. The resin was high speed shear mixed at 3500 RPM for a total of 10 minutes. The resin was then degassed again and was then cast to make impact and tensile coupons.

In an experimental probe sonication embodiment, BMI resin was melted and degassed in an oven at 110° C. for about 15 minutes under vacuum. A probe sonicator (Q700 from QSonica) with a frequency of 20 kHz at 100% amplitude was used to probe sonicate the resin for a pulse duration of 30 second-1 minute (on and off pulse), while temperature was maintained at 110° C. The total effective sonication time (excluding off time) was 12 minutes. The resin was then cast to make impact and tensile coupons. To make a control specimen, the resin was melted and degassed in an oven at 110° C. for about 15 minutes under vacuum and was then cast to make impact and tensile coupons.

In both experimental embodiments, the cure and post cure temperature and their duration were kept the same for all conditions: 4-hours at 191° C. and 2-hours at 227° C., respectively. Three variations in specimen casting conditions were explored:

1. Condition 'A'—Specimens were in the mold (cure+post cure) for complete duration.
2. Condition 'B1'—Specimens were in the mold while curing but free standing for post cure; that is, specimens are demolded while in the oven at curing temperature up on completion of cure cycle of 4 hours for further free-standing post-cure.
3. Condition 'B2'—Specimens were in the mold while curing but free standing for post cure, oven was cooled down to room temperature after completion of cure cycle, specimens were demolded, and oven was heated to post cure temperatures for free-standing post-cure.

The control specimen and the HSSM p-BMI were casted under all the above conditions while PS p-BMI was casted under condition B1 and B2.

A silicone mold with impact bar and tensile specimen cavities is used to pour melt resin into them and cast specimens. A mold release agent (Ease release 205 from Mann Formulated Products) was applied to the mold and left to dry for 30 minutes at room temperature. The mold was then preheated to 191° C. and held under vacuum for 10 minutes. The resin was then poured in to the cavities of the mold. Samples were then casted as per conditions A, B1 and B2. The cured samples were polished on a Buehler MetaSery polisher using a silicon carbide paper, first with abrasive grade P280, followed by P600 and P1200.

Impact tests were conducted following ASTM D4812 standard which employs an unnotched cantilever beam impact resistance test. The sample dimensions were 63.5×12×3.2 (length×width×thickness) (mm). The statistical significance of mechanical properties was determined using p-values from comparison of individual pairs using student's T test in JMP Pro 13 software.

Figure 5:
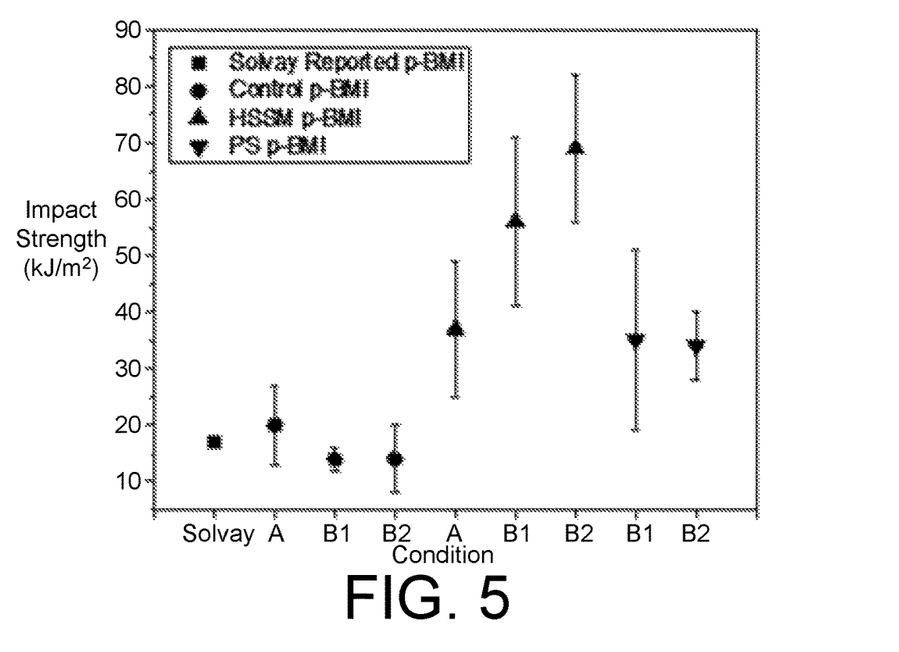
FIG. 5 is a graph relating impact strength of certain materials to their condition.

As shown in FIG. 5, use of HSSM leads to an increase in impact strength irrespective of the casting condition, when compared to control p-BMI casted under same conditions. For condition 'A', 'B1' and 'B2', an increase of 85%, 300% and 392% respectively, was observed. While the casting conditions didn't have any statistically significant effect on the impact properties of either control p-BMI or PS p-BMI, for HSSM p-BMI, impact strength was found to be maximum for condition 'B2' being 69 kJ/m$^2$, 56 kJ/m$^2$ for condition 'B1' and 37 kJ/m$^2$ for condition 'A.' HSSM and PS rearranges the three components of BMI with respect to each other at the molecular level. Upon cure, HSSM BMI has a different molecular packing compared to Melt BMI. At the nano-scale, the Melt and HSSM BMI have nano-heterogenity on the order of 16 and 11 nm, respectively.

Figure 6:
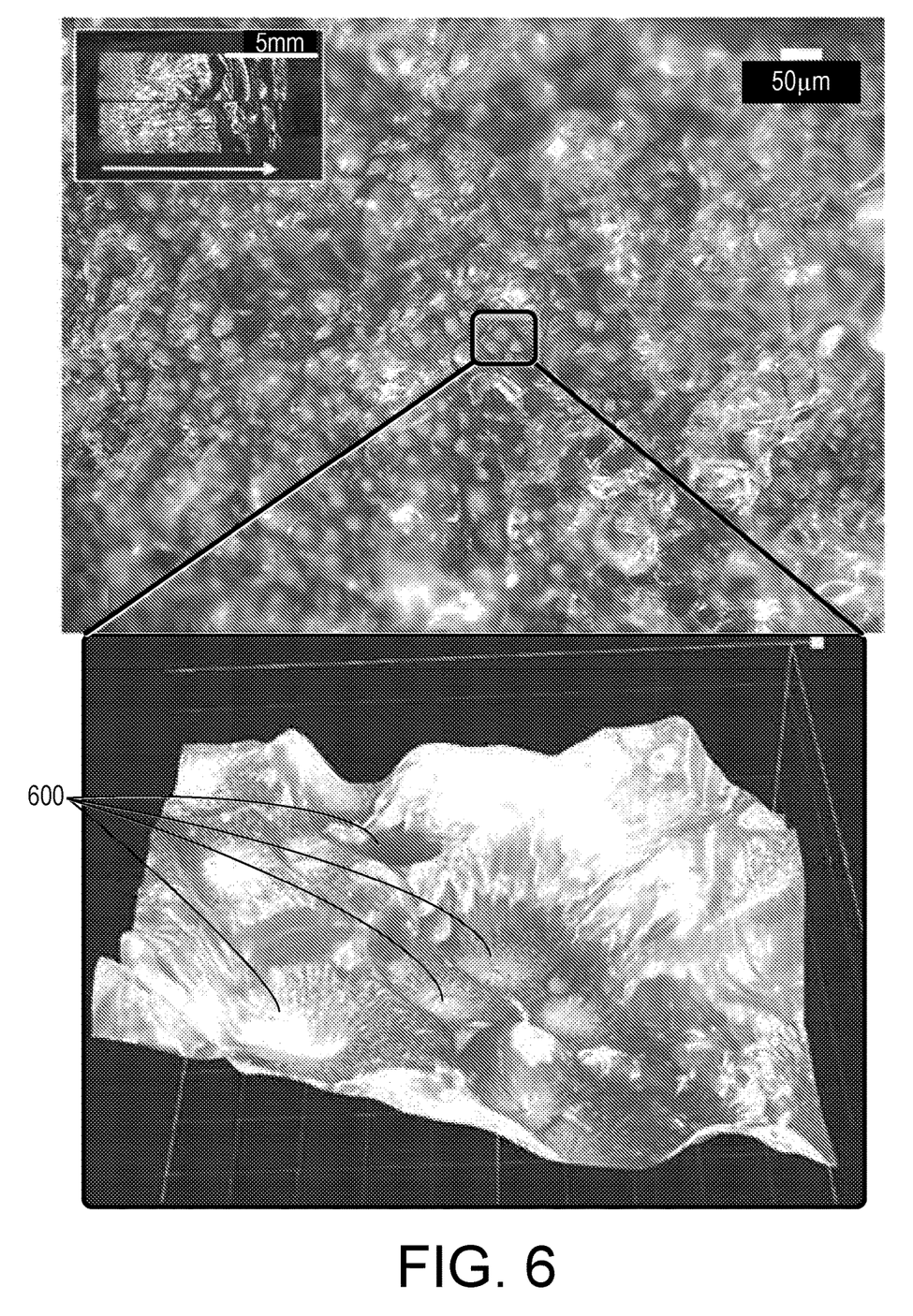
FIG. 6 is an optical micrograph of a fracture surface in a cured bismaleimide product in a crack initiation zone demonstrating "nodular" morphology.
Figure 7:
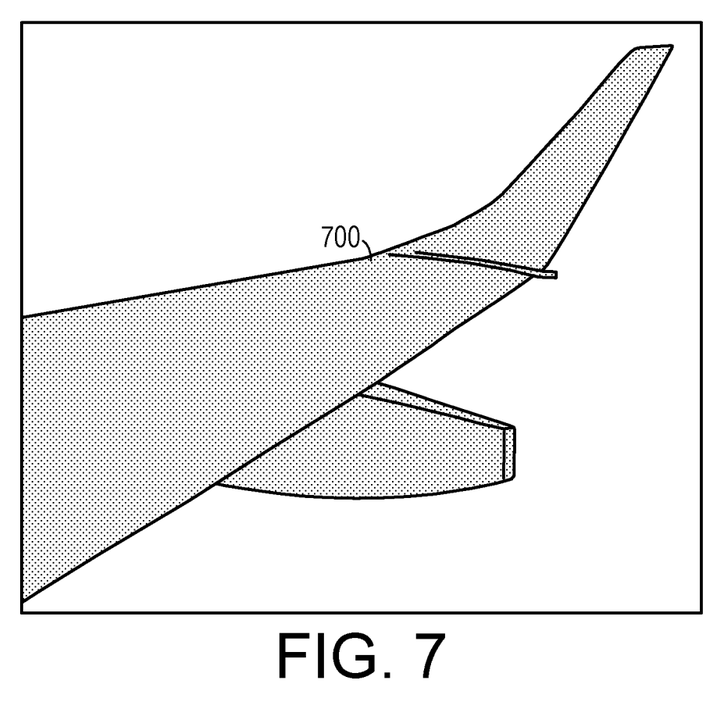
FIG. 7 is a view of an aircraft portion employing a bismaleimide product composite.

As shown in FIG. 6, the cured bismaleimide is found to include spherical nodular features 600 that have a diameter in a range of 10 µm to 20 µm in a zone of plastic deformation. Such features are believed to disperse energy as cracks begin to form, thereby greatly increasing the impact resistance of the material. When combined with reinforcing materials, such as carbon fibers, composite prepregs can be prepared which can further be used to make composite parts that are useful in many different structures, such as aircraft structural elements (for example, struts and the skin 700 of wings, as shown in FIG. 7).

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of making a material, comprising the steps of:
  (a) heating a bismaleimide system to generate a bismaleimide liquid;
  (b) degassing the bismaleimide liquid to generate a degassed bismaleimide liquid;
  (c) performing at least one of shear mixing and probe sonication to the degassed bismaleimide liquid to generate a mixed bismaleimide liquid phase; and
  (d) curing the mixed bismaleimide liquid phase, wherein the curing step comprises:
    (i) heating the mixed bismaleimide liquid phase to at least 177° C. for 4 hours to generate a cured material;
    (ii) cooling the cured material to room temperature; and
    (iii) then heating the cured material to 227° C. for 2 hours to generate a post-cured material; and
    (iv) cooling the post-cured material to room temperature so as to generate a cured bismaleimide product.

2. The method of claim 1, heating step comprises heating the bismaleimide system to a temperature of 110° C.

3. The method of claim 1, wherein the bismaleimide system comprises a three component bismaleimide system.

4. The method of claim 1, further comprising the step of adding the bismaleimide liquid to a reinforcing agent.

5. The method of claim 1, further comprising the step of adding a modifier to the bismaleimide liquid.

6. The method of claim 5, further comprising the step of adding the bismaleimide liquid and the modifier to a reinforcing agent.

7. The method of claim 6, wherein the reinforcing agent is selected from a list of reinforcing agents consisting of: fibers, mats, sheets, yarns, tapes, and combinations thereof.

8. The method of claim 6, wherein the reinforcing agent is selected from a list of reinforcing agents consisting of: carbon fibers, carbon nanotube sheets, carbon nanotube yarns, carbon nanotube forest and carbon nanotube tape, and combinations thereof.

9. The method of claim 5, wherein the modifier comprises graphitic structures.

10. The method of claim 9, wherein the graphitic structures are selected from a list consisting of carbon nanotubes, graphene ribbons, and combinations thereof.

11. The method of claim 5, wherein the modifier is selected from a list of modifiers consisting of: an elastomer, a rubber, an emulsifier, calcium carbonate, boron nitride, silicon nitride, silicon carbide, boron carbide, nanoclay, nanosilica, bisphenol A, epoxy, benzoxazine, cyante esters, thermoplastics, and combinations thereof.

12. The method of claim 1, wherein the degassing step comprises subjecting the bismaleimide liquid to a 30 mbar vacuum until no new visually perceptible bubbles are detected in the bismaleimide liquid.

13. The method of claim 1, wherein the shear mixing step comprises mixing the degassed bismaleimide liquid in a shear mixer at a speed of 3500 RPM for 10 minutes.

14. The method of claim 13, wherein the shear mixer comprises a dual asymmetric centrifugal shear mixer.

15. The method of claim 1, further comprising the steps of:
  (a) heating a mold to 191° C.; and
  (b) placing the mixed bismaleimide liquid phase into the mold prior to the curing step.

16. The method of claim 1, further comprising the step of adding a reinforcing filler to the mixed bismaleimide liquid phase.

17. A method of making a material, comprising the steps of:
   (a) heating a bismaleimide system to generate a bismaleimide liquid;
   (b) degassing the bismaleimide liquid to generate a degassed bismaleimide liquid;
   (c) performing at least one of shear mixing and probe sonication to the degassed bismaleimide liquid to generate a mixed bismaleimide liquid phase;
   (d) heating a mold to 191° C.;
   (e) placing the mixed bismaleimide liquid phase into the mold; and
   (f) curing the mixed bismaleimide liquid phase after the step of placing the mixed bismaleimide liquid phase into the mold.

18. The method of claim 17, heating step comprises heating the bismaleimide system to a temperature of 110° C.

19. The method of claim 17, wherein the bismaleimide system comprises a three component bismaleimide system.

20. The method of claim 17, further comprising the step of adding the bismaleimide liquid to a reinforcing agent.

21. The method of claim 17, further comprising the step of adding a modifier to the bismaleimide liquid.

22. The method of claim 21, further comprising the step of adding the bismaleimide liquid and the modifier to a reinforcing agent.

23. The method of claim 22, wherein the reinforcing agent is selected from a list of reinforcing agents consisting of: fibers, mats, sheets, yarns, tapes, and combinations thereof.

24. The method of claim 22, wherein the reinforcing agent is selected from a list of reinforcing agents consisting of: carbon fibers, carbon nanotube sheets, carbon nanotube yarns, carbon nanotube forest and carbon nanotube tape, and combinations thereof.

25. The method of claim 21, wherein the modifier comprises graphitic structures.

26. The method of claim 25, wherein the graphitic structures are selected from a list consisting of carbon nanotubes, graphene ribbons, and combinations thereof.

27. The method of claim 21, wherein the modifier is selected from a list of modifiers consisting of: an elastomer, a rubber, an emulsifier, calcium carbonate, boron nitride, silicon nitride, silicon carbide, boron carbide, nanoclay, nanosilica, bisphenol A, epoxy, benzoxazine, cyante esters, thermoplastics, and combinations thereof.

28. The method of claim 17, wherein the degassing step comprises subjecting the bismaleimide liquid to a 30 mbar vacuum until no new visually perceptible bubbles are detected in the bismaleimide liquid.

29. The method of claim 17, wherein the shear mixing step comprises mixing the degassed bismaleimide liquid in a shear mixer at a speed of 3500 RPM for 10 minutes.

30. The method of claim 29, wherein the shear mixer comprises a dual asymmetric centrifugal shear mixer.

31. The method of claim 17, wherein the curing step comprises:
   (a) heating the mixed bismaleimide liquid phase to at least 177° C. for 4 hours to generate a cured material;
   (b) cooling the cured material to room temperature;
   (c) then heating the cured material to 227° C. for 2 hours to generate a post-cured material; and
   (d) cooling the post-cured material to room temperature so as to generate a cured bismaleimide product.

32. The method of claim 17, further comprising the step of adding a reinforcing filler to the mixed bismaleimide liquid phase.

\* \* \* \* \*